United States Patent
Ohmi et al.

(10) Patent No.: US 7,085,628 B2
(45) Date of Patent: Aug. 1, 2006

(54) APPARATUS FOR THE CORRECTION OF TEMPERATURE DRIFT FOR PRESSURE SENSOR, PRESSURE CONTROL APPARATUS AND PRESSURE-TYPE FLOW RATE CONTROL APPARATUS

(75) Inventors: Tadahiro Ohmi, 1-17-301, Komegahukuro 2-chome, Aoba-ku, Sendai-shi, Miyagi 980-0813 (JP); Tomio Uno, Osaka (JP); Osamu Nakamura, Osaka (JP); Nobukazu Ikeda, Osaka (JP); Ryousuke Dohi, Osaka (JP); Kouji Nishino, Osaka (JP); Atsushi Matsumoto, Osaka (JP); Kazuhiko Sugiyama, Tokyo (JP)

(73) Assignees: Fujikin Incorporated, Osaka (JP); Tadahiro Ohmi, Sendai (JP); Tokyo Electron Ltd., Tokyo (JP)

( * ) Notice: Subject to any disclaimer, the term of this patent is extended or adjusted under 35 U.S.C. 154(b) by 359 days.

(21) Appl. No.: 10/476,973
(22) PCT Filed: Nov. 22, 2002
(86) PCT No.: PCT/JP02/12251
§ 371 (c)(1), (2), (4) Date: Nov. 7, 2003
(87) PCT Pub. No.: WO03/058187
PCT Pub. Date: Jul. 17, 2003

(65) Prior Publication Data
US 2004/0144178 A1 Jul. 29, 2004

(30) Foreign Application Priority Data
Dec. 28, 2001 (JP) .............................. 2001-399910

(51) Int. Cl.
*G06D 23/00* (2006.01)
(52) U.S. Cl. ...................... 700/299; 700/301; 700/276; 73/708; 361/283.1

(58) Field of Classification Search .................. 73/708, 73/152.56, 724; 700/276, 299, 301; 702/100, 702/130, 13; 137/102; 361/283.1
See application file for complete search history.

(56) References Cited

U.S. PATENT DOCUMENTS 4,667,516 A * 5/1987 Schulz ......................... 73/708

(Continued)

FOREIGN PATENT DOCUMENTS

| JP | 8-338546 | 12/1996 |
|----|----------|---------|
| JP | 2000-214029 | 8/2000 |
| JP | 2000-337982 | 12/2000 |

OTHER PUBLICATIONS

International Search Report for PCT/JP02/12251, completed Jan. 6, 2003, and mailed Jan. 21, 2003, from the Japanese Patent Office.

(Continued)

*Primary Examiner*—Leo Picard
*Assistant Examiner*—Sheela S. Rao
(74) *Attorney, Agent, or Firm*—Griffin & Szipl, P.C.

(57) ABSTRACT

A pressure sensor, a pressure control apparatus, and a flow rate control apparatus are provided to automatically correct temperature drift of the pressure sensor and accurately detect pressure despite changes in temperature. An embodiment includes an upstream side pressure sensor between an orifice and a control valve, to control flow rate through the orifice by a regulating control valve, while calculating the flow from the upstream side pressure. With a temperature sensor, a memory means, and a temperature drift correcting means which calculates drift of the upstream side pressure sensor from data in the memory means when the temperature of the fluid changes and offsets the output drift of the upstream side pressure sensor with the calculated amount of the output drift, temperature drift of the pressure sensor is automatically corrected, enabling accurate control of flow rate.

18 Claims, 9 Drawing Sheets

U.S. PATENT DOCUMENTS 5,466,923 A * 11/1995 Merletti ................. 250/214 PR
5,524,084 A * 6/1996 Wang et al. ................. 702/100
6,338,358 B1 * 1/2002 Watanabe et al. ........... 137/102
6,813,954 B1 * 11/2004 Gokhfeld ..................... 73/718

OTHER PUBLICATIONS

First page of WO 03/058187 A1 (international publication corresponding to PCT/JP02/12251).

* cited by examiner

$P_{1m} = 3.0 \ [10^2 \ kPaA]$
$v_0 = -2.0 \ [mV]$
$v_1 = 40.8 \ [mV]$
$V_m = 5.0 \ [V]$
$M = 117$
$V_m = M(v_1 - v_0)$
$V = M(v - v_0)$

APPARATUS FOR THE CORRECTION OF TEMPERATURE DRIFT FOR PRESSURE SENSOR, PRESSURE CONTROL APPARATUS AND PRESSURE-TYPE FLOW RATE CONTROL APPARATUS

This is a National Phase Application in the United States of International Patent Application No. PCT/JP02/12251 filed Nov. 22, 2002, which claims priority on Japanese Patent Application No. 2001-399910, filed Dec. 28, 2001. The entire disclosures of the above patent applications are hereby incorporated by reference.

BACKGROUND OF THE INVENTION

1. Field of the Invention

The present invention relates to a pressure sensor, a pressure control apparatus and a pressure-type flow rate control apparatus for use mainly in semiconductor manufacturing facilities, chemical plants, etc. More particularly, the present invention concerns apparatus for correcting temperature drift—for use in a pressure sensor, a pressure control apparatus, and a pressure-type flow rate control apparatus—which accurately detects the pressure of a fluid by automatically negating or correcting a temperature drift, thus controlling the pressure and flow rate of fluid, where the output of a pressure sensor for measuring the pressure of the fluid drifts as a result of a temperature change.

2. Description of the Prior Art

In semiconductor manufacturing facilities, chemical plants, etc., a plurality of gases as materials are commonly supplied at specific flow rates, and are reacted in a reaction vessel to produce an object or target gas. In this process, if the material gases are not supplied accurately, then the chemical reaction proceeds unevenly, and it can occur that material gases remain unreacted in the produced object gas. Especially, where the material gases are flammable, there is a danger of gas explosions. In order for the material gases to react in a well-balanced manner, it is necessary to control accurately the flow rates of the gases to be supplied.

Hitherto, the flow rates of gases have been controlled through the use of the following arrangements: an orifice is mounted in a pipe, a theoretical flow rate formula is selected that can indicate as accurately as possible the flow rate of a gas passing through said orifice, and the flow rate of the gas passing through the orifice is calculated using the flow rate formula. In the flow rate formula that has been used hitherto, the fluid is assumed to be incompressible, and the flow rate Qc is expressed as:

$$Qc = KP_2^{1/2}(P_1 - P_2)^{1/2}$$

where $P_1$ is the pressure on an upstream side of the orifice,
$P_2$ is the pressure on an downstream side of the orifice, and
K is a proportional constant which depends on the fluid temperature.

In the flow rate formula, the flow rate is calculated from two pressure parameters $P_1$ and $P_2$. However, since the actual gas flow comprises a compressible fluid, the above theoretical flow rate formula is not very precise. On the other hand, if the ratio $P_2/P_1$ of above-mentioned pressures is reduced below a critical value of about 0.5, then the flow velocity of the gas passing through the orifice reaches sonic velocity, and it is known that under sonic velocity conditions, the theoretical formula is:

$$Qc = KP_1$$

It is known that as long as critical conditions are satisfied, the flow rate simply depends only on the upstream side pressure $P_1$, and yields accurately the rate of a compressible fluid passing through the orifice.

For approximate flow rate control of an incompressible fluid, therefore, the theoretical flow rate formula:

$$Qc = KP_2^{1/2}(P_1 - P_2)^{1/2}$$

is used. Under critical conditions ($P_2/P_1 <$ about 0.5), the theoretical flow rate formula:

$$Qc = KP_1$$

is predominantly used for controlling the flow-rate of a fluid. Where either of these flow rate formulae is used, the measurement of the fluid pressures, $P_1$ and/or $P_2$, is a prerequisite. That is, in the case of former, the simultaneous measurement of $P_1$ and $P_2$ is necessary, and in the latter case the measurement of the upstream side pressure $P_1$ is required.

In order to measure fluid pressure, it is necessary to install a pressure sensor in the fluid. The pressure sensor therefore becomes very sensitive to the fluid temperature, and the sensor temperature immediately becomes equal to the fluid temperature T. In other words, equilibrium between the fluid temperature T and the temperature of the sensor is immediately established. In order to measure the fluid pressure accurately, it is necessary to reduce the size of the pressure sensor to such an extent that the flow of the fluid is undisturbed. Accordingly, it will be appreciated that equilibrium is reached very quickly.

On the other hand, the gaseous fluid flowing through the pipe is controlled so that the fluid flows as far as possible at a constant temperature. However, it is known that over a period of many hours, the temperature of a flow of gas fluctuates considerably. Furthermore, when a gas fluid is replaced by another gas, it can happen that an high temperature gas flows for a certain period of time, whilst a low temperature gas flows for another period of time. Accordingly, if a fluid of fluctuating temperature is measured using the same pressure sensor, then the temperature drift characteristics of the pressure sensor output present a problem such that the detected pressure of the fluid needs to be corrected.

Prior art pressure sensors invariably display a temperature drift, irrespective of the method of pressure detection. "Temperature drift" means that when the ambient temperature around the pressure sensor changes, the output of the pressure sensor changes under constant pressure. It is found that this output drift correlates to the fluid temperature.

Some pressure sensors have a built-in temperature compensation circuit, but even here, if the temperature drift is 0.05%/° C., for example, then an output drift of 4% will occur when the temperature changes from 20 to 100° C.

Pressure sensors are available in various different types. Consider a strain gauge for example: A strain gauge converts pressure into a voltage such that with pressure plotted on an abscissa axis, the ordinate axis corresponds to output voltage. Of course, if the absolute pressure is zero, then the output voltage will be zero, and it is expected that with an increase in absolute pressure, the output voltage will rise.

The sensor output recorded when zero pressure is applied to the pressure sensor is called the "zero-point output". The temperature drift of the zero-point output, which is the fluctuation in the zero-point output occurring in accordance with temperature change, is called the "zero-point pressure drift". On the other hand, the temperature drift of the sensor output observed when pressure is applied is called the "span output drift". In order to obtain an accurate sensor output, it is necessary to adjust for both zero-point output drift and span output drift.

More specifically, assume that the pressure sensor has no zero-point output drift, and that its zero-point voltage is 0 (V). Also assume that when the absolute pressure of the fluid is 1.0 ($\times 10^2$ kPaA), i.e. 1 atm, the output voltage is 20 mV. When the fluid temperature changes under these conditions, the output voltage naturally deviates from 20 mV. This fluctuation is the above-mentioned span output drift. In practice, since some zero-point output is always present, the span output drift at any arbitrary pressure is displaced by the zero-point voltage.

As described above, in a pressure-type flow rate control apparatus that controls a fluid passing through an orifice by measuring an upstream side pressure $P_1$ or a downstream side pressure $P_2$, temperature fluctuation characteristics called the zero-point output drift and the span output drift are included in the output voltage of the pressure sensor. If the output voltage is converted directly into a voltage, therefore, the pressures $P_1$, $P_2$ will contain errors. If the flow rate is calculated in accordance with the aforesaid flow rate formula, then those errors will be introduced into the calculated flow rate, Qc. This is the problem of temperature drift in pressure-type flow rate control apparatus.

The zero point and span temperature drift characteristics of a pressure sensor are different as between different pressure sensors. It is desirable to obtain an accurate sensor output by providing a method of correcting the temperature drift.

SUMMARY OF THE INVENTION

Accordingly, it is an object of the apparatus for correcting temperature drift according to the present invention to measure accurately the pressure of a fluid by automatically correcting, through a control circuit or control software, the zero-point output drift and/or span output drift of a pressure sensor caused by temperature fluctuations. It is another object of the present invention to provide a pressure control apparatus and a pressure-type flow rate control apparatus using such a pressure sensor, to control pressure and flow rate accurately by correcting the zero-point output drift and/or span output drift of the pressure sensor.

The invention of claim 1 relates to an apparatus for correcting pressure sensor temperature drift for use in a pressure sensor for measuring the pressure of a fluid, said apparatus comprising a temperature sensor for measuring the temperature of a fluid, a memory means for storing the relation between the fluid temperature and a pressure sensor output drift, and a temperature drift correcting means which calculates a pressure sensor output drift amount from data in the memory means when the fluid temperature changes, and negates the output drift of the pressure sensor on the basis of the calculated output drift amount, thereby correcting the temperature drift, such that even if the temperature of fluid changes, the fluid pressure can be measured accurately.

The invention of claim 2 is an apparatus for correcting temperature drift for use in a pressure control apparatus comprising a control valve for pressure control and a pressure sensor for measuring the pressure of a fluid, the apparatus for correcting temperature drift comprising a memory means for storing a relation between the fluid temperature and a pressure sensor output drift, and a temperature drift correcting means which calculates a pressure sensor output drift amount from data in the memory means when the fluid temperature changes, and negates the output drift of the pressure sensor on the basis of the calculated output drift amount, thereby correcting the temperature drift, such that even if the fluid temperature changes, the pressure of fluid is accurately controlled.

The invention of claim 3 is an apparatus for correcting temperature drift for use in a pressure-type flow rate control apparatus comprising an orifice for controlling flow rate, a control valve provided in a pipe on an upstream side of said orifice, and an upstream side pressure sensor provided between the orifice and the control valve for detecting the upstream side pressure $P_1$, such that the flow rate of a fluid passing through the orifice can be controlled on the basis of the upstream side pressure $P_1$, said apparatus for correcting temperature drift comprising a temperature sensor for measuring the temperature of the fluid, a memory means for storing a relation between the temperature of the fluid and an output drift of the upstream side pressure sensor, and a temperature drift correcting means which calculates the amount of the output drift of the upstream side sensor from data in the memory means when the temperature changes, and negates the output drift of the upstream side sensor on the basis of said calculated amount of the output drift, thereby correcting the temperature drift, such that even if the temperature of the fluid fluctuates, the flow rate of fluid can be controlled accurately.

The invention of claim 4 is an apparatus for correcting temperature drift for use in a pressure-type flow rate control apparatus comprising an orifice for controlling flow rate, a control valve provided in a pipe on an upstream side of said orifice, an upstream side pressure sensor provided between said orifice and said control valve for detecting the upstream side pressure, $P_1$, and a downstream side pressure sensor provided in a pipe on a downstream side of the orifice for detecting the downstream side pressure, $P_2$, such that the flow rate of the fluid passing through the orifice can be controlled on the basis of the upstream side pressure, $P_1$, and the downstream side pressure, $P_2$, said apparatus for correcting temperature drift comprising a temperature sensor to measure the temperature of the fluid, a memory means for storing a relation between the temperature of the fluid and output drifts of the upstream side pressure sensor and the downstream side pressure sensor, and a temperature drift correcting means which calculates output drift amounts of the upstream side pressure sensor and the downstream side pressure sensor from data in the memory means when the temperature changes, and negates said output drifts of the upstream side pressure sensor and downstream side pressure sensor on the basis of the calculated output drift amounts, thereby correcting said temperature drifts, such that even if the fluid temperature changes, the flow rate of fluid is controlled accurately.

The invention of claim 5 is an apparatus for correcting temperature drift as claimed in claim 1, 2, 3, or 4, wherein said memory means stores a relation, which exists at zero pressure, between the fluid temperature and a "zero-point output drift" of the pressure sensor, and the temperature drift correcting means calculates a zero-point output drift amount when the temperature of the fluid changes, and cancels the zero-point output drift on the basis of the calculated zero-point drift amount, thereby correcting the temperature drift.

The invention of claim 6 is an apparatus for correcting temperature drift as claimed in 1, 2, 3, or 4, wherein said memory means stores a relation under any arbitrary pressure between the fluid temperature and a "span output drift" of the pressure sensor, a span output drift amount is calculated from said memory means when the fluid temperature changes, and the calculated span output drift amount is added to or subtracted from the output of the pressure sensor such that the temperature drift is corrected.

The invention of claim 7 is an apparatus for correcting temperature drift according to any one of claims 1 to 6 for use in a gas supply system, in which gas is caused to flow as a fluid, for controlling the gas pressure and the gas flow rate.

REFERENCE NUMBERS

2: improved pressure-type flow rate control apparatus;
4: orifice;
4a: orifice hole;
6: upstream side pipe;
8: downstream side pipe;
10: upstream side pressure sensor;
12: downstream side pressure sensor:
14: temperature sensor;
16: control circuit;
17: flow rate calculating means;
18: flow rate setting means;
19: comparison circuit;
20: valve drive apparatus;
22: control valve;
24: gas tank;
26: regulator;
27: supply side pipe;
28: valve;
29: control side pipe;
30: valve;
32: chamber;
34: vacuum pump;
40: offset D/A converter;
40a: D/A converter for rough adjustment;
40b: D/A converter for fine adjustment;
40c: buffer;
40d: buffer;
40e: buffer;
41: CPU;
42: fixed amplifier;
42a: offset terminal;
44: variable amplifier;
46: variable amplifier;
48: A/D converter;
50: constant temperature bath;
52: reference pressure generator;
56: fixed amplifier;
58: A/D converter;
60: temperature drift correcting means;
62: zero point correcting means;
64: memory means;
66: span correcting means;
68: gas temperature correcting means;
72: A/D converter;
74: fixed amplifier;
76: fixed amplifier;
78: A/D converter;
DP: vacuum pump;
$P_1$: upstream side pressure;
$P_2$: downstream side pressure;
Qc: calculated flow rate;
Qs: set flow rate;
ΔQ: flow rate difference;
v0: zero point drift voltage;
v: output voltage;
V: pressure voltage

DESCRIPTION OF THE PREFERRED EMBODIMENTS

By analysing the zero-point output drift and span output drift of a pressure sensor caused by a temperature change, the inventors have succeeded in developing a method of correcting the temperature drift, not only for the pressure sensor, but also for a pressure control apparatus, and a pressure-type flow rate control apparatus in which the pressure sensor is used.

Embodiments of the apparatus for correcting temperature drift for a pressure-type flow rate control apparatus according to the present invention will be described below with reference to the drawings.

Figure 1:
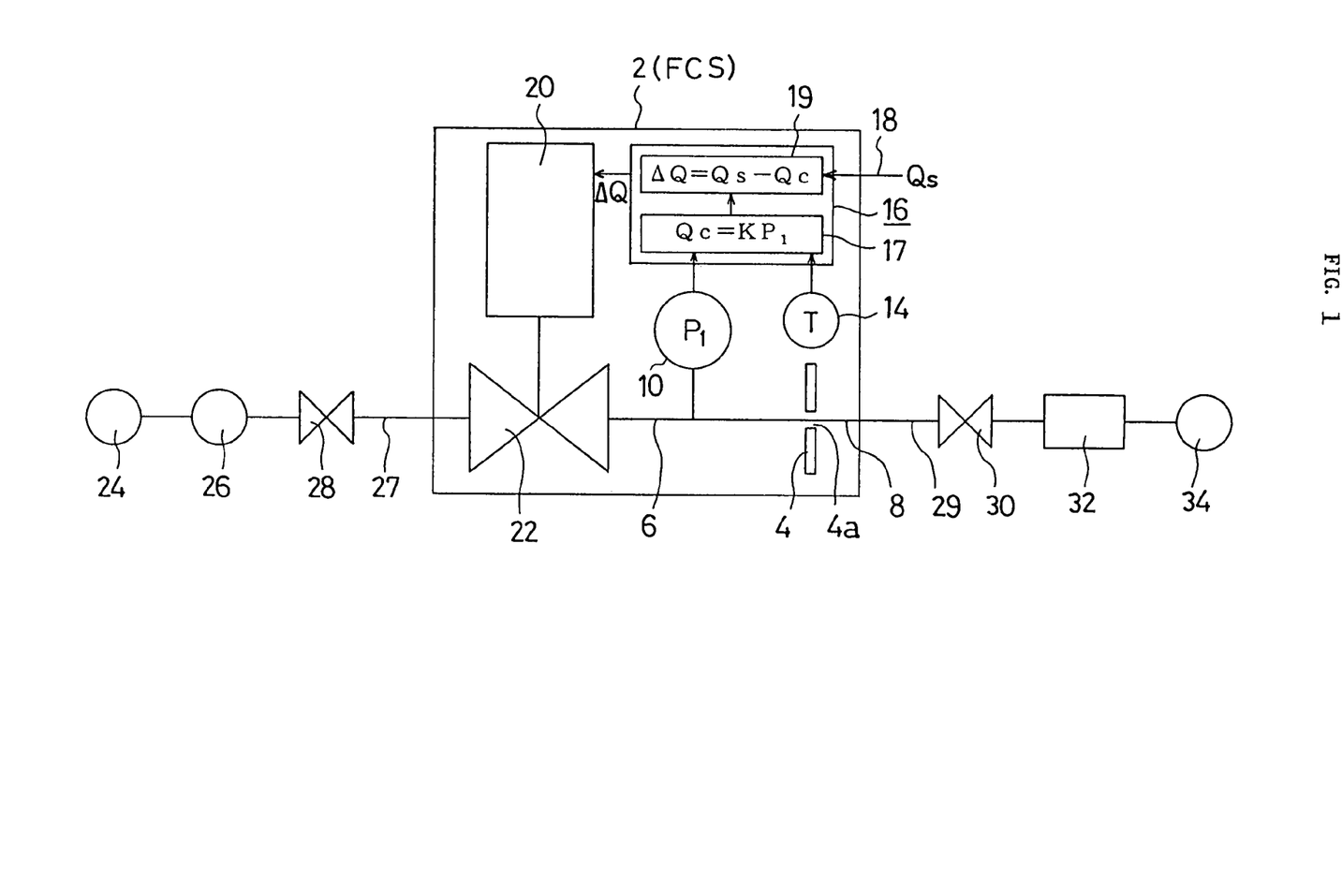
FIG. 1 is a schematic diagram of flow rate control according to the present invention using a pressure-type flow rate control apparatus which operates under critical conditions.

FIG. 1 is a schematic diagram of flow rate control according to the present invention using a pressure-type flow rate control apparatus which operates under critical conditions. In said pressure-type flow rate control apparatus 2, it is a prerequisite that a fluid to be supplied is under critical conditions, i.e. that the velocity of the fluid flowing out of an orifice 4 is at sonic velocity. The flow rate can therefore be expressed as:

$$Q=KP_1.$$

Pressure is measured only by an upstream side pressure sensor 10.

Said pressure-type flow rate control apparatus 2 comprises said orifice 4 having an orifice hole 4a, an upstream side pipe 6, a downstream side pipe 8, an upstream side pressure sensor 10, a temperature sensor 14, a control circuit 16, a valve drive unit 20, and a control valve 22.

The control circuit 16 comprises an electronic circuit, a microcomputer, and a built-in programme, as its principal components. However, said control circuit 16 may comprise an electronic circuit alone, or an electronic circuit and a personal computer. Said control circuit 16 comprises an electronic circuit system, such as an amplification circuit and an A/D converter (not shown), a flow rate calculating means 17 for calculating a flow rate Qc using an empirical flow rate formula, a flow rate setting means 18 for transmitting a set flow rate Qs for the fluid, and a comparison means 19 for determining $\Delta Q$ (=Qs–Qc), the difference between the calculated flow rate Qc and the set flow rate Qs. The flow rate difference $\Delta Q$ may be calculated as Qc–Qs.

On the upstream side of said improved pressure-type flow rate control apparatus 2, the following components are connected: a gas tank 24 containing an high pressure gas, a regulator 26 for regulating properly the pressure of the gas in the high-pressure gas tank, and a valve 28 for leading said gas from a supply side pipe 27 to said control valve 22.

Further, on the downstream side of the improved pressure-type flow rate control apparatus 2, the following components are connected: a control side pipe 29 for flowing gas at said regulated flow rate, a valve 30 for feeding said gas to a chamber 32, and a vacuum pump 34. The chamber 32 is a reaction chamber for producing a target gas from supplied material gases. For example, material gases $H_2$ and $O_2$ form $H_2O$ moisture gas in the reaction chamber.

Next, the control operation of the improved pressure-type flow rate control apparatus 2 will be explained. On the upstream side, a gas under specific pressure is supplied to the supply side pipe 27. Further, the rate of gas flow to the upstream side pipe 6 is controlled by the control valve 22, whose opening is regulated by said valve drive unit 20. At the same time, on the downstream side, the downstream side pipe 8 is maintained at a set low pressure by the dry pump 34.

By means of evacuation by the vacuum pump 34, the downstream side pressure $P_2$ within said downstream side pipe 8 is held substantially lower than the upstream side pressure $P_1$, and is automatically set such that critical conditions, i.e. $P_2/P_1$<about 0.5, always apply. For this reason, the velocity of the gas flowing out of the orifice hole 4a is sonic velocity. The flow rate Q of the gas passing through the orifice 4 can therefore be calculated by $Q=KP_1$.

The upstream side pressure $P_1$ is measured using the pressure sensor 10. To measure the pressure accurately, the upstream side pressure sensor 10 is installed with its sensor part in contact with the gas flow. The sensor part is designed to be dimensionally very small so as not to disturb the gas flow. The temperature of the sensor part is therefore almost equal to the gas temperature T.

Furthermore, the gas temperature T is measured by the temperature sensor 14. Said temperature sensor 14 measures the temperature near the orifice 4, so that the gas flow is not disturbed, and if the gas and the orifice are in thermal equilibrium, then the two are identical in temperature. The orifice temperature can therefore be measured as the gas temperature.

The upstream side pressure $P_1$ and the gas temperature T are obtained as voltages and converted into digital signals by an amplification circuit or an A/D converter (not shown). Said digital signals are inputted to the flow rate calculating means 17, and the proportional coefficient K is calculated from the gas temperature T and the physical properties of the gas. Furthermore, by using the upstream side pressure $P_1$, the calculated flow rate Qc can be determined by $Qc=KP_1$.

The set flow rate Qs is inputted from the flow rate setting means 18, and the flow rate difference $\Delta Q$ is calculated as $\Delta Q=Qs-Qc$ by said comparison means 19. In order to calculate said flow rate difference $\Delta Q$, the formula $\Delta Q=Qc-Qs$ may be used.

Said flow rate difference $\Delta Q$ is outputted to the valve drive unit 20, and the opening of the control valve 22 is controlled so as to reduce $\Delta Q$ to zero. By means of this opening adjustment, the upstream side pressure $P_1$ of the gas is adjusted so that the calculated flow rate Qc obtained from $Qc=KP_1$ is equal to the set flow rate.

As mentioned above, the temperature of the sensor part of the pressure sensor 10 is equal to the gas temperature T, and if the gas temperature T changes, then the temperature of the sensor changes correspondingly. However, the pressure sensor is temperature dependent, and the output voltage of the pressure sensor drifts as the temperature changes. The correction of this output drift will now be described.

Figure 2:
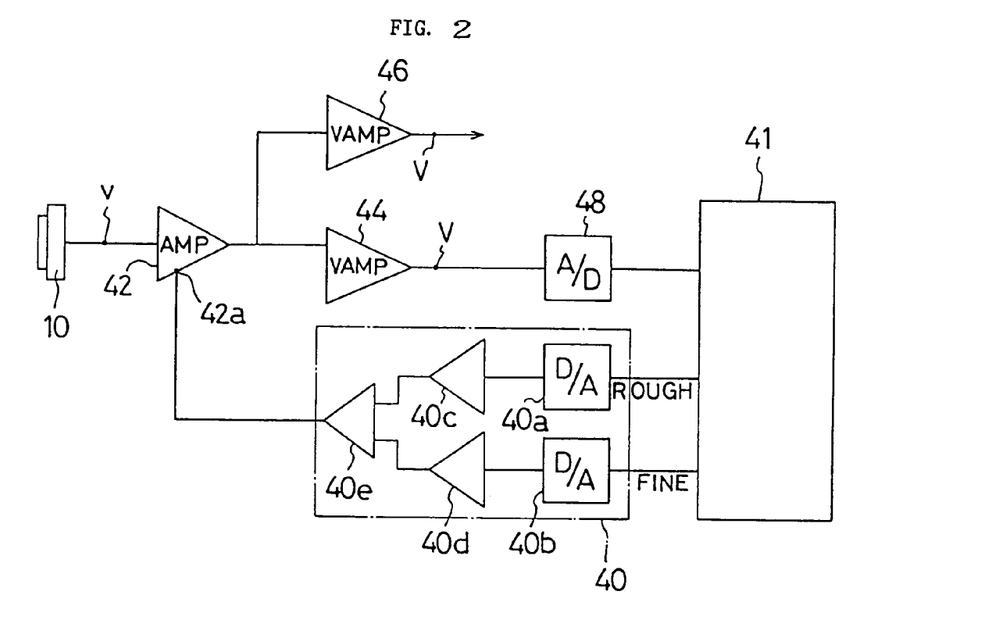
FIG. 2 is a simplified block circuit diagram for the correction of zero-point output drift in a pressure-type flow rate control apparatus.

FIG. 2 is a simplified block circuit diagram for the correction of zero-point output drift in the pressure-type flow rate control apparatus. The output voltage v of the pressure sensor 10 is amplified up to the pressure voltage V by a fixed amplifier 42 and a variable amplifier 44. The pressure voltage V is inputted to a CPU 41 via an A/D converter 48. Furthermore, the output of the fixed amplifier 42 is also outputted to another variable amplifier 46, and the output of said other variable amplifier 46 also gives the pressure voltage V, and is displayed as the upstream side pressure $P_1$ on a display panel.

Assume, by way of example, that the upstream side pressure sensor 10 used in this embodiment outputs 100 mV when it detects an absolute pressure $P_1$=7 atm, i.e. 7 ($\times 10^2$ kPaA). If the upstream side pressure $P_1$ is controlled in the range $P_1$=0–3 ($\times 10^2$ kPaA) using said sensor 10, then the output voltage v of the upstream side pressure sensor 10 will be in the range v=0–42.86 mV.

If the maximum voltage 42.86 mV of said output voltage v is normalised to a peak value of 5V, then the amplification is 117 times. The amplification of 117 times is achieved in the present embodiment by an amplification of 100 times using the fixed amplifier 42 and an amplification of 1.17 times using the variable amplifiers 44 and 46.

However, the output of the pressure sensor 10 drifts as the temperature changes. The output drift displayed when the pressure is zero will be called the "zero-point output drift", and the drift under any arbitrary pressure will be called the "output drift".

The zero-point output drift is corrected by adjusting an input voltage to an offset terminal 42a of the fixed amplifier 42.

Specifically, correction of the above-mentioned zero-point output drift is effected by an offset D/A converter 40. That is, when, with the pressure at zero, the output voltage v has a certain value $v_o$, $-v_o$ is applied to the offset terminal 42a to reduce said zero-point output drift voltage $v_o$ to zero. As a result, even if $v_o$ is inputted to the fixed amplifier 42 when the pressure is zero, the effective input voltage is $v_o+(-v_o)=0$, and the zero-point output drift is corrected.

The offset D/A converter 40 comprises a D/A converter 40a for rough adjustment (ROUGH) having a buffer 40c, a D/A converter 40b for fine adjustment (FINE) having a buffer 40d, and a summing buffer 40e. As already described, an inverted zero-point correction voltage $-v_o$ of the zero point drift voltage $v_o$ is applied to the offset terminal 42a by the circuits for rough adjustment and fine adjustment to cancel out the zero-point output drift voltage $v_o$, thereby correcting the zero-point output drift.

Figure 3:
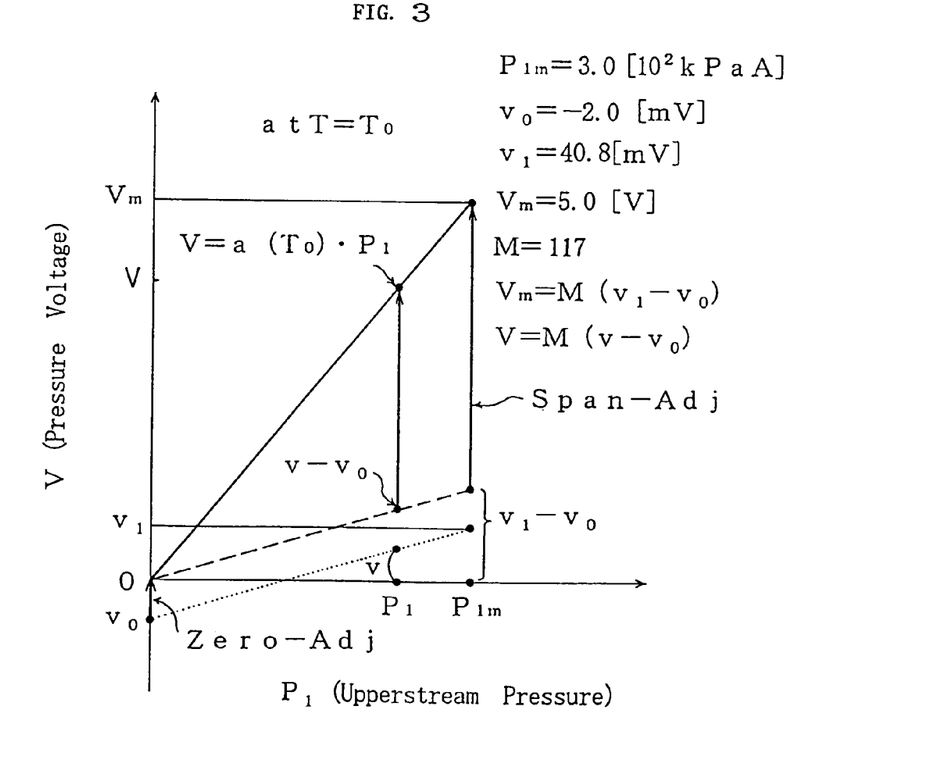
FIG. 3 is an explanatory diagram of the correction of zero-point output drift and normalisation.

FIG. 3 is an explanatory diagram of zero-point drift correction and normalisation. The abscissa axis plots the upstream side pressure $P_1$, while the ordinate axis plots the output voltage v and pressure voltage V. Assume that the pressure range is $P_1=0-P_{1m}$, and the maximum pressure is $P_{1m}=3.0$ ($\times 10^2$ kPaA). Assume that when the gas temperature T is $T_0$, the zero-point output drift is $v_0=-2.0$ mV. Assume that at the maximum pressure $P_{1m}$, the sensor maximum output is $v_1=40.8$ mV.

The fine dotted line between $v_o$ and $v_1$ shows the temperature characteristics of the pressure sensor 10. If $-v_0$ is applied to the offset terminal 42a, then $v_0+(-v_0)=0$, i.e. $v_0$ is negatived and corrected to 0 mV, which is shown as "Zero-Adj". As a result, at the maximum pressure $P_{1m}$ too, $v_1+(-v_0)=40.8+2.0=42.8$ mV. The output of pressure sensor 10 is therefore corrected to 0–42.8 mV by correcting the zero-point output drift. This correction is shown as the thick broken line.

Next, normalisation of the pressure sensor 10 is carried out. When the output of the pressure sensor is 0 to $(v_1+(-v_o))$ after Zero-Adj, that is 0–42.8 mV, it is normalised to a peak value of 5 V. In other words, to amplify 42.8 mV to 5V, the amplification provided by the variable amplifiers 44, 46 will be 1.17. As a result, the two-stage amplification is set at M=100×1.17=117. This correction is shown as "Span-Adj".

The maximum voltage $V_m$ is therefore given as $V_m=M(v_1-v_0)$. The output v of the pressure sensor 10 under an arbitrary pressure $P_1$ is amplified to $V=M(v-v_0)$. Said amplified output V is indicated by the thick solid line. Under critical conditions, this thick solid line indicates $V=a(T_0)P_1$. The proportional constant $a(T_0)$ represents a proportional constant when the gas temperature T is $T_0$.

Figure 4:
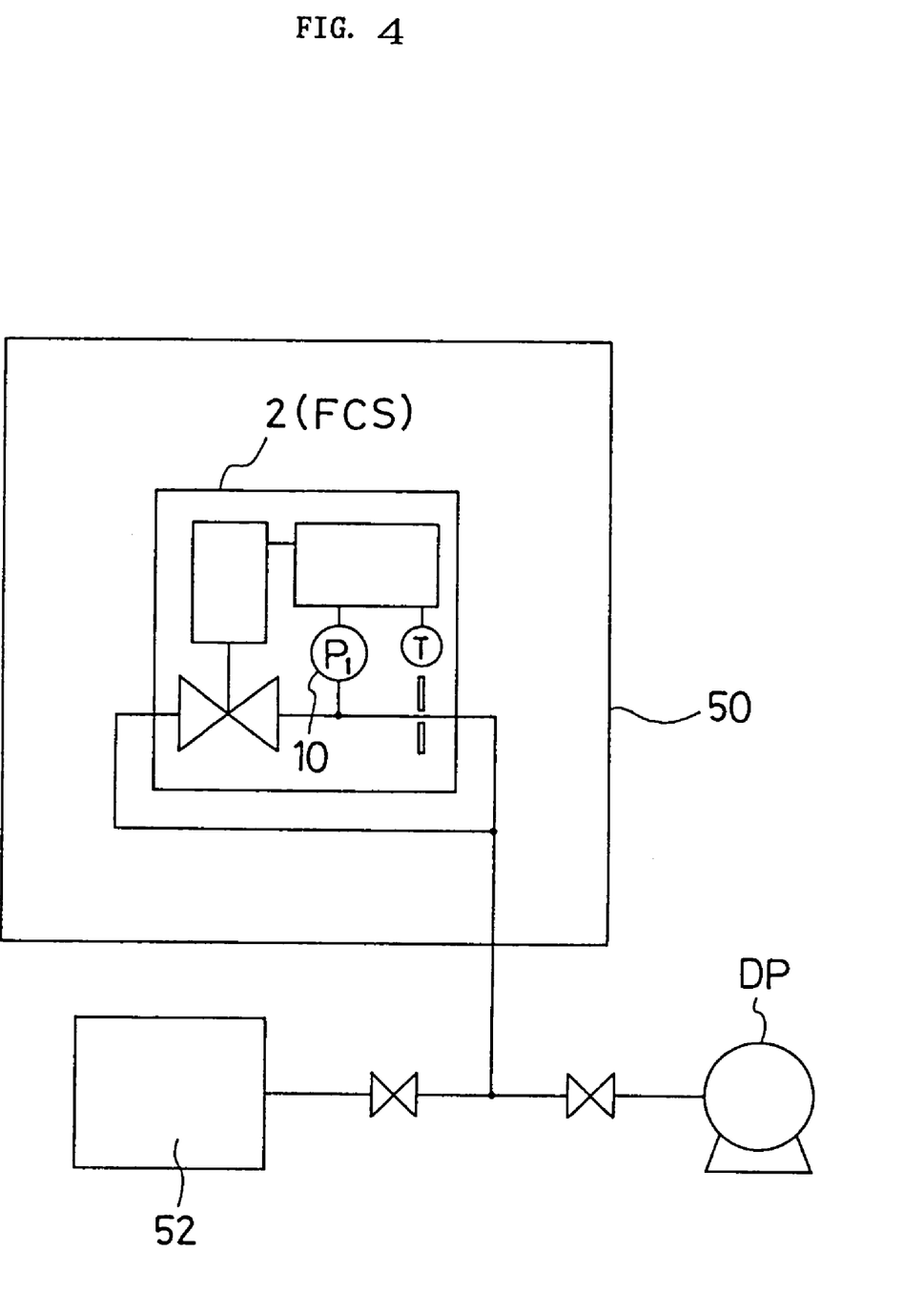
FIG. 4 is an explanatory diagram of a method for measuring the output drift of a pressure sensor.

FIG. 4 is an explanatory diagram of a method of measuring the output drift of a pressure sensor. The pressure sensor 10, as incorporated in a pressure-type flow rate control apparatus, is mounted in a constant temperature bath 50. A vacuum pump DP and a reference pressure generator 52 disposed outside the constant temperature bath 50 are connected to the pressure-type flow rate control apparatus by a pipe.

The pressure within the pipe is held at zero (vacuum), i.e. $P_1=0$ ($\times 10^2$ kPaA), by the vacuum pump DP, and the zero-point output drift voltage $v_0$ of the pressure sensor 10 is measured as the temperature is changed. Furthermore, by switching over the valves, the pressure $P_1$ of the reference pressure generator 52 is set at a specific pressure, and while the temperature is changed, the output voltage v of pressure sensor 10 is measured.

Figure 5:
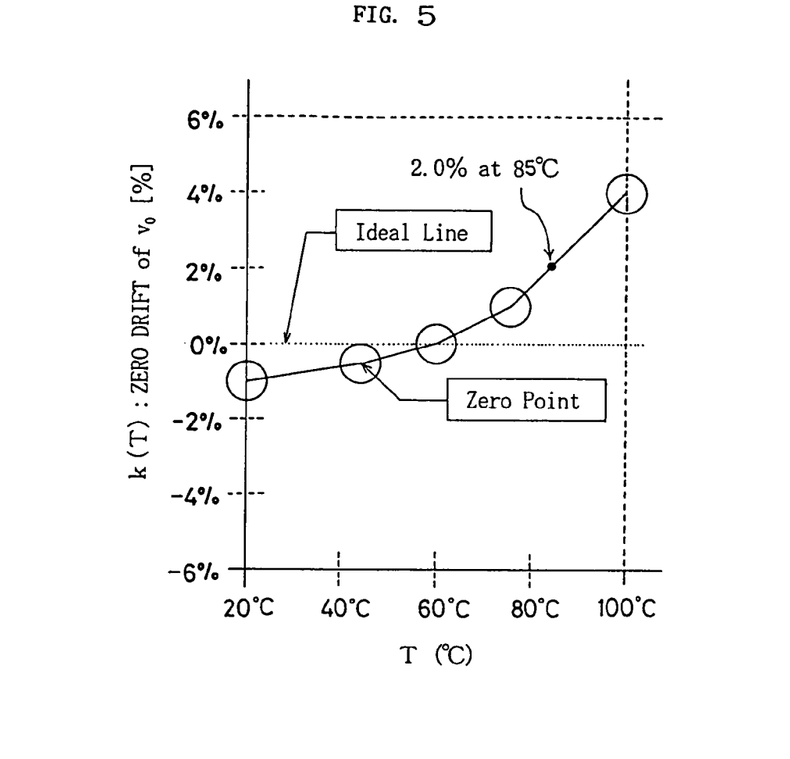
FIG. 5 is a diagram of the zero-point output drift (ZERO DRIFT) temperature characteristics of a pressure sensor.

FIG. 5 is one example of a temperature characteristics diagram of the zero-point output drift (ZERO DRIFT) of a pressure sensor. The abscissa axis represents gas temperature T, whilst the ordinate axis represents the relative ratio k (T) of the zero-point output drift voltage $v_0$. The thin dotted line at 0% indicates an ideal line without drift, whilst the thin solid, polygonal line indicates an actual, measured zero-point output drift. This drift is zero at 60° C. and about 2.0% at 85° C. Said relative ratio k (T) is converted into the zero-point output drift voltage $v_0$ and applied to the above-mentioned offset terminal 42a.

Figure 6:
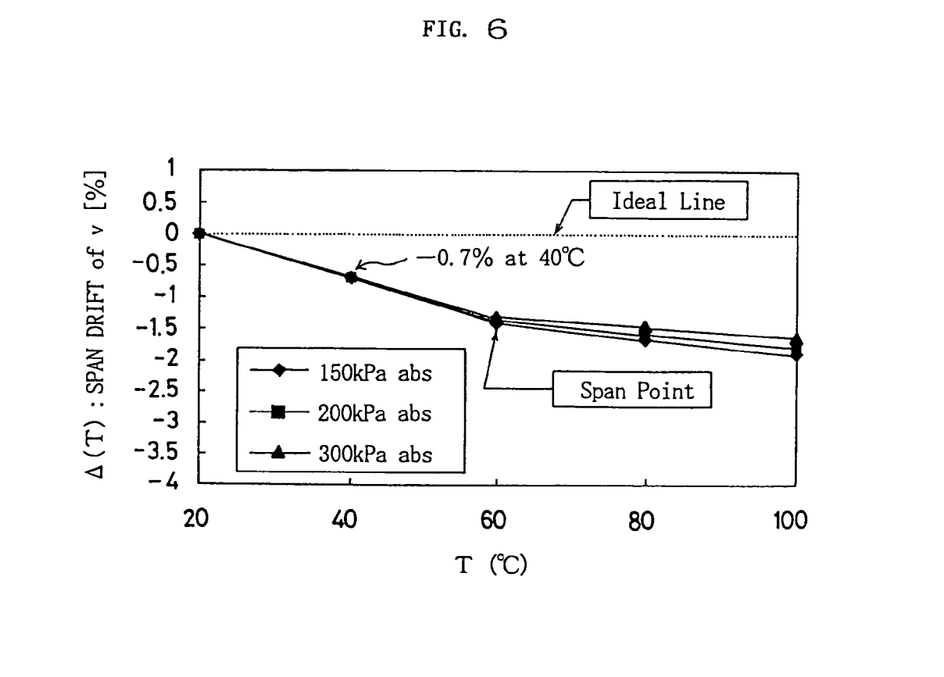
FIG. 6 is a diagram of the output drift (SPAN DRIFT) temperature characteristics of a pressure sensor.

FIG. 6 is a temperature characteristics diagram of the output drift (SPAN DRIFT) of a pressure sensor. The abscissa axis represents the gas temperature T, whilst the ordinate axis indicates the relative ratio Δ (T) of span output drift voltage v at a given pressure. The output drift was measured at three different pressures, 1.5, 2.0, 3.0 ($\times 10^2$ kPaA), and it was found that as the pressure changes, the output drift changes slightly. At a low temperature, such as not higher than 60° C., it was found that the difference in pressure can be ignored. Correction can therefore be made using the average drift, assuming that the output drift is constant at all arbitrary pressures.

Figure 7:
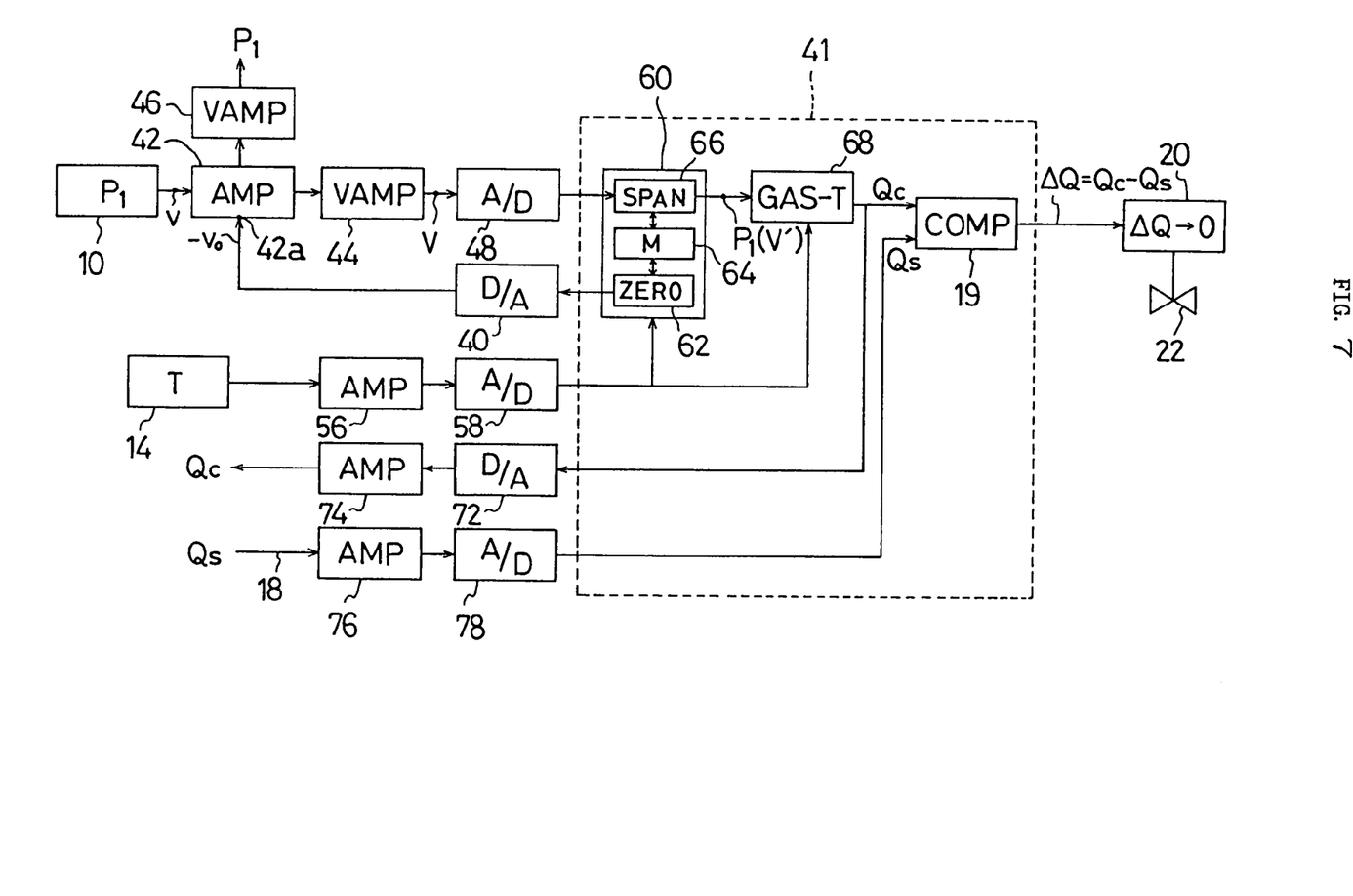
FIG. 7 is a detailed schematic block diagram of a control circuit for a pressure-type flow rate control apparatus.

FIG. 7 is a detailed schematic block diagram of a control circuit in a pressure-type flow rate control apparatus. The pressure sensor 10, fixed amplifier 42, variable amplifiers 44, 46, A/D converter 48, offset D/A converter 40 are all the same as those in FIG. 2, and will not be explained further.

The gas temperature output measured by the temperature sensor 14 is amplified to a gas temperature T by the fixed amplifier 56 and is inputted to the CPU 41 via an A/D converter 58. Said gas temperature T is inputted to a temperature drift correcting means 60 and a gas temperature correcting means 68.

Said temperature drift correcting means 60 comprises a zero point correction means 62, a memory means 64, and a span correction means 66. In said memory means 64, the following data are stored: the relative ratio k (T) of the zero-point output drift as shown in FIG. 5, and the relative ratio Δ (T) of the output drift as shown in FIG. 6.

When the gas temperature T is inputted to the zero point correcting means 62, the corresponding relative ratio data k . . . , relating to the zero-point output drift, is obtained from the memory means 64, and the relative ratio k (T) at gas temperature T is calculated. From this calculated relative ratio k (T), the zero-point output drift voltage $v_0$ is determined, and the inverted voltage $-v_0$ is applied to the offset terminal 42a through the offset D/A converter 40; the zero-point output drift is thus automatically corrected.

Further, when the gas temperature T is inputted to the span correction means 66, the corresponding relative data Δ . . . , relating to the span output drift, is obtained from the memory means 64, and the relative ratio Δ (T) at gas temperature T is calculated. The span output drift is determined using the calculated relative ratio Δ (T). By subtracting the span output drift from the pressure voltage V inputted from A/D converter 48, an accurate upstream side pressure $P_1$ is obtained.

Furthermore, when the gas temperature T is inputted to the gas temperature correcting means 68, an accurate proportional constant K is determined on the basis of inputted physical data, and from said proportional constant K and said upstream side pressure $P_1$, a calculated flow rate Qc is obtained from $Qc=KP_1$. Said calculated flow rate Qc is outputted via a D/A converter 72 and a fixed amplifier 74, and is displayed on an exterior display device (not shown).

Said set flow rate Qs inputted from the flow rate setting means 18 as the flow rate of fluid to be supplied is inputted to the comparison means 19 via a fixed amplifier 76 and an A/D converter 78. On the other hand, the calculated flow rate Qc is inputted to the comparison means 19 from the gas temperature correction means 68, and the flow rate difference ΔQ is calculated by ΔQ=Qc−Qs and outputted to the valve drive unit 20.

Said valve drive unit 20 controls the opening of the control valve 22 so as to bring the flow rate different ΔQ to zero. By adjusting the opening of the control valve 22, the upstream side pressure $P_1$ is controlled. As a result, the control valve 22 is automatically regulated so that ΔQ becomes zero and the calculated flow rate Qc is equal to the set flow rate Qs.

Figure 8:
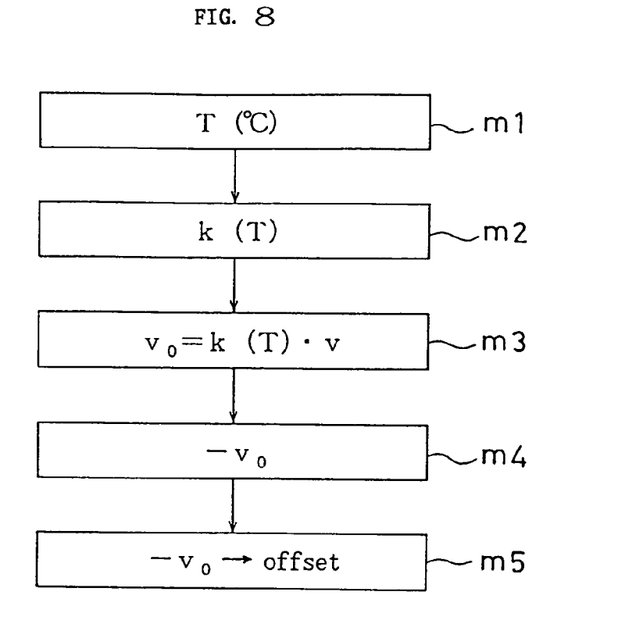
FIG. 8 is a flow chart of a zero-point output correcting means 62 according to the present invention.

FIG. 8 is a flow diagram of the operation of the zero point correction means 62 according to the present invention. At step m1, the gas temperature T is inputted, and at step m2 the relative ratio k (T) at gas temperature T is derived from the relative ratio data in the memory means 64. At step m3, the zero-point output drift voltage $v_0$ is calculated from relative ratio k (T) and the output voltage v of the pressure sensor 10.

At step m4, said voltage $v_0$ is inverted, and at step m5 $-v_0$ is applied to said offset terminal 42a. The zero point is thus corrected.

Figure 9:
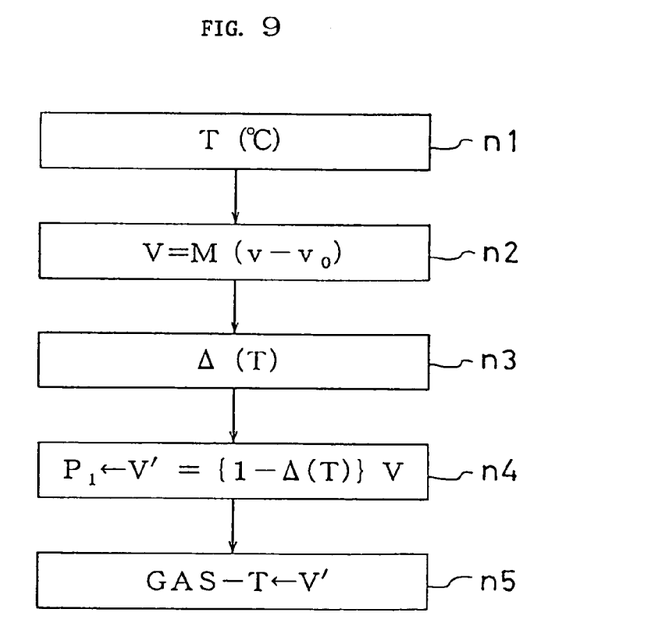
FIG. 9 is a flow diagram of the operation of a span correcting means 66 according to the present invention.

FIG. 9 is a flow diagram of the operation of the span correction means 66 according to the present invention. At step n1, the gas temperature T is inputted. Contemporaneously, at step n2, the output voltage v measured by the pressure sensor 10 is subjected to zero-point output correction and inputted as a pressure voltage V.

At step n3, the relative ratio $\Delta$ (T) of drift at gas temperature T is determined on the basis of the relative ratio data in the memory means 64. At step n4, a temperature-corrected pressure voltage V' is calculated from said relative ratio $\Delta$ (T) and the above-mentioned pressure voltage V. Said temperature-corrected pressure voltage V' is an accurate upstream side pressure $P_1$. At step n5, said upstream side pressure $P_1$ is inputted to the gas temperature correction means 68.

Figure 10:
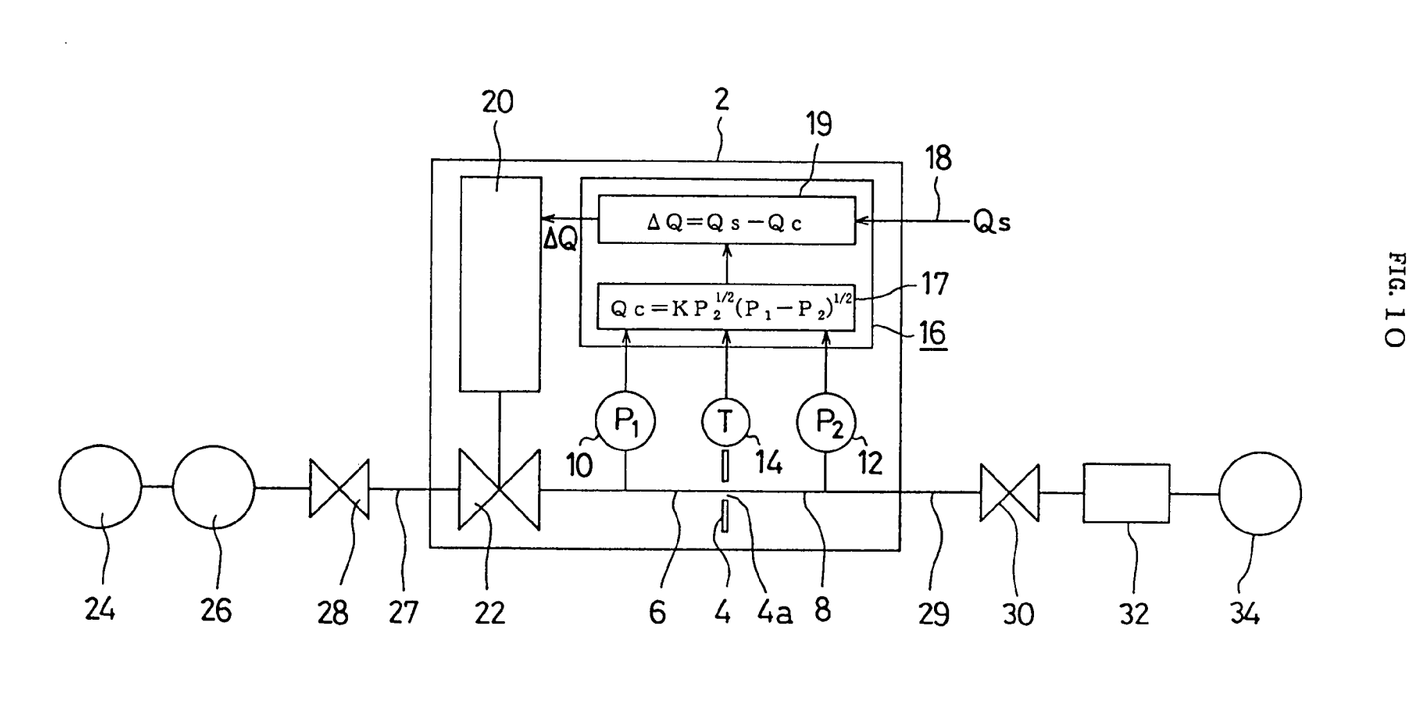
FIG. 10 is a schematic diagram of fluid control according to the present invention using a pressure-type flow rate control apparatus which operates under non-critical conditions.

FIG. 10 is a schematic diagram of flow rate control according to the present invention using a pressure-type flow rate control apparatus which operates under non-critical conditions. In said pressure-type flow rate control apparatus 2, it is a prerequisite that the fluid to be supplied is under non-critical conditions, i.e. the velocity of fluid flowing from the orifice 4 is lower than sonic velocity.

When the fluid is under non-critical conditions, one of the theoretical flow rate formulae for a fluid passing through an orifice is derived from Bernoulli's theorem which holds good for an incompressible fluid, and is given as:

$$Q = KP_2^{1/2}(P_1 - P_2)^{1/2}$$

In this embodiment, the gas flow rate is controlled using this theoretical flow rate formula.

According to this flow rate formula, the flow rate Q of the fluid passing through the orifice is calculated from the upstream side pressure $P_1$ and the downstream side pressure $P_2$. While the upstream side pressure $P_1$ is measured by the pressure sensor 10, and the downstream side pressure $P_2$ is constantly measured by the downstream side pressure sensor 12, therefore, the calculated flow rate Qc is obtained from:

$$Qc = KP_2^{1/2}(P_1 - P_2)^{1/2}$$

What is different from FIG. 1 is that an electronic circuit system and a software system are added in which the downstream side pressure $P_2$ is measured by the downstream side pressure sensor 12, and the measured value is inputted to the control circuit 16. The same electronic circuit system and software system as those that are connected to the upstream side pressure sensor 10 are provided in parallel for this purpose.

Figure 11:
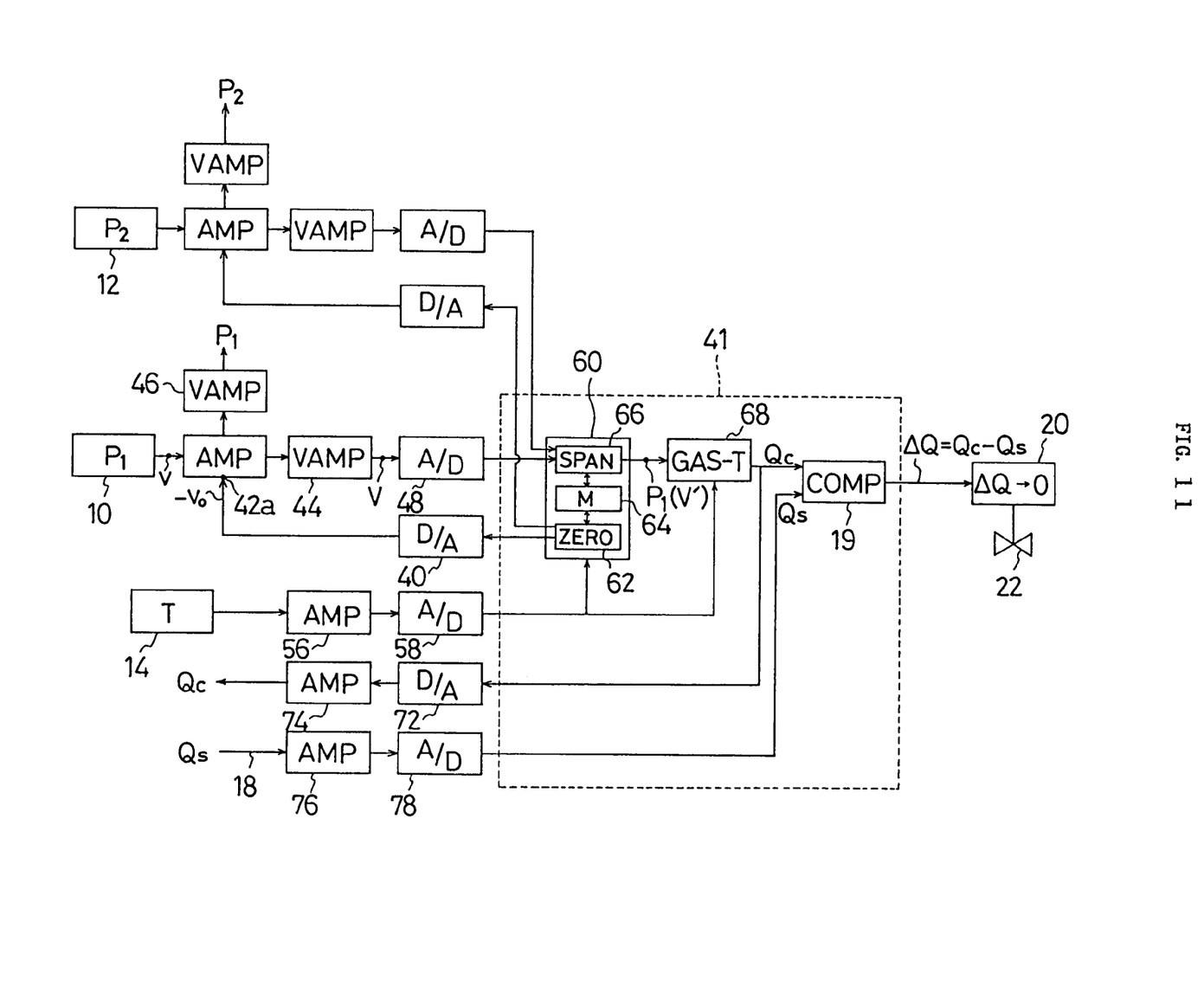
FIG. 11 is a detailed schematic block diagram of the control circuit of FIG. 10.

FIG. 11 is a detailed schematic block diagram of the control circuit of FIG. 10. The electronic circuit system that is connected to the downstream side pressure sensor 12 includes a fixed amplifier (AMP), a variable amplifier (VAMP), a variable amplifier for display (VAMP), an A/D converter, and an offset D/A converter. This electronic circuit system is mounted in the input system of said CPU 41.

In addition, the software system for the upstream side pressure sensor 10 is used commonly. That is, said software system comprehends said memory means 64 for storing data relating to the zero-point output drift and span output drift of the downstream side pressure sensor 12, said zero point correction means 62 for correcting the zero-point output drift, and said span correction means 66 for correcting said span output drift, both using these data. The software systems are installed in the CPU 41.

By providing such electronic circuit and software systems, and installing the flow rate calculating means 17 for calculating $Qc = KP_2^{1/2}(P_1 - P_2)^{1/2}$ in the control circuit 16, and at same time by providing the comparison means 19 for calculating the flow rate difference $\Delta Q = Qs - Qc$, the flow rate is controlled to obtain a target flow rate. The operation and effects of the other components are the same as those in FIG. 1 and will not be explained further.

Figure 12:
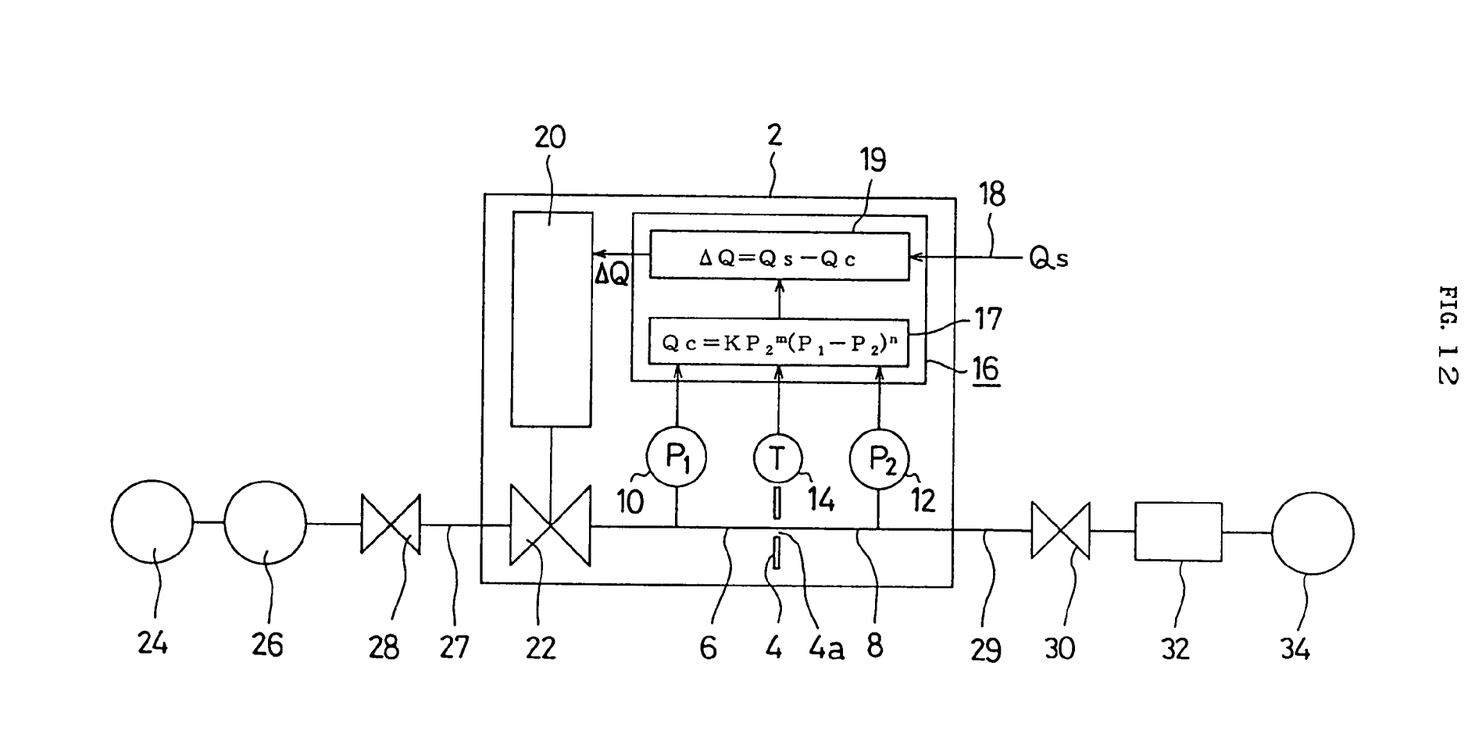
FIG. 12 is a schematic diagram of flow rate control according to the present invention using an improved pressure-type flow rate control apparatus which operates under non-critical conditions.

FIG. 12 is a schematic diagram of flow rate control according to the present invention using an improved pressure-type flow rate control apparatus which operates under non-critical conditions. In said pressure-type flow rate control apparatus 2, it is a prerequisite that the fluid to be supplied is under non-critical conditions, but an improved theoretical flow rate formula is used.

Since actual gaseous fluids are expandable and compressible, and since accordingly Bernoulli's theorem, which assumes incompressibility, holds good only approximately, the flow rate formula represented by $Qc = KP_2^{1/2}(P_1 - P_2)^{1/2}$ is only an approximate formula. Improving on this approximate formula, the inventors have found a formula that can represent actual flow rates with great precision.

In the improved flow rate formula, the equation:

$$Qc = KP_2^m(P_1 - P_2)^n$$

is used. The two parameters m, n are introduced as fitting exponents, that is, for matching actual flow rates to the flow rate formula. The values obtained were m=0.47152, n=0.59492. Using these values, actual flow rates can be calculated with great precision.

In this embodiment, the flow rate calculation means 17 is provided using the improved flow rate formula. Except in this respect, this embodiment is wholly the same as the embodiment shown in FIG. 10. That is, the systems for correcting the temperature drifts of the upstream side pressure sensor 10 and the downstream side pressure sensor 12 are the same as those in FIG. 11, and will not be explained further.

The present invention has just been described with regard to pressure-type flow rate control apparatus, but it can also be used for the correction of temperature drift (zero-point output drift and span output drift) of the pressure sensor itself. Furthermore, the present invention can be used to correct the temperature drift of a pressure control apparatus with a built-in pressure sensor.

Needless to say, the present invention is not restricted to the above-mentioned embodiments. It is to be understood that the present invention covers a variety of examples and design changes within its technical scope, without departing from the spirit or scope of the present invention.

EFFECTS OF THE INVENTION

The invention of claim 1 provides a pressure sensor that can accurately detect pressure by providing a temperature drift correcting means by which the temperature drift of the output of the pressure sensor can be cancelled.

The invention of claim 2 provides a pressure control apparatus having a pressure sensor and a control valve, which can control pressure with precision, whilst accurately detecting the pressure, by having a temperature drift correcting means that can negate the temperature drift of the pressure sensor output.

The invention of claim 3 has a memory means for storing a relation between the fluid temperature and the output drift of an upstream side sensor, and a temperature drift correction means which calculates the amount of the output drift of the upstream side pressure sensor from data in the memory means when the fluid temperature changes, and offsets the output drift of the upstream side sensor with the calculated amount of output drift, thereby correcting the temperature drift. As a result, even if a pressure sensor having any temperature characteristics is used, the upstream side pressure $P_1$ can be accurately detected merely by storing the temperature characteristics in the memory means. The flow rate can therefore be controlled accurately in pressure-type flow rate control apparatuses where $Qc=KP_1$ is used as the flow rate formula.

The invention of claim 4 has a memory means for storing a relation between the fluid temperature and the output drifts of an upstream side sensor and a downstream side sensor, and a temperature drift correcting means which calculates the amounts of the output drift of the upstream side sensor and the downstream side sensor from data in memory means when the fluid temperature changes, and negatives the output drifts of the upstream side sensor and downstream side sensor with the calculated output drift amounts. As a result, even if a pressure sensor having any temperature characteristics is used, the upstream side pressure $P_1$ and downstream side $P_2$ can be accurately detected merely by storing the temperature characteristics of the pressure sensors in the memory means. Hence, in a pressure-type flow rate control apparatus where $Qc=KP_2^{1/2}(P_1-P_2)^{1/2}$ or $Qc=KP_2^m(P_1-P_2)^n$ is used, the flow rate can be accurately controlled.

According to the invention of claim 5, since the relation at zero pressure between the fluid temperature and the zero-point output drift of the pressure sensor is stored in the memory means, the amount of the zero-point output drift can be calculated from data in the memory means, even if the fluid temperature changes to any level, whereby the zero-point output drift of the pressure sensor can be negated on the basis of the calculated zero-point output drift amount, thereby correcting the temperature drift.

According to the invention of claim 6, since the relation under any arbitrary pressure between the fluid temperature and the span output drift of the pressure sensor is stored in the memory means, the amount of the span output drift can be calculated from data in the memory means even if the fluid temperature changes to any level under any arbitrary pressure, such that the span output drift of the pressure sensor can be automatically negated with the calculated span output drift amount, thereby correcting the temperature drift.

According to the invention of claim 7, even if the temperature of the flowing gaseous fluid undergoes any changes, the gas pressure can be detected accurately, thus making it possible to improve the control efficiency of the gaseous fluid in semiconductor manufacturing facilities, chemical production plants, etc.

The invention claimed is:

1. An apparatus for correcting temperature drift for use in a pressure sensor for measuring the pressure of a fluid, said apparatus comprising a temperature sensor for measuring the temperature of the fluid, a memory means for storing a relation between the fluid temperature and an output drift of the pressure sensor, and a temperature drift correcting means for calculating the amount of the output drift of the pressure sensor from data in the memory means when the fluid temperature changes, and negating said output drift of the pressure sensor with said calculated amount of the output drift, thereby correcting the temperature drift, such that even if the temperature of fluid changes, the fluid pressure can be measured accurately.

2. An apparatus for correcting temperature drift for use in a pressure control apparatus comprising a control valve for pressure control and a pressure sensor for measuring the pressure of a fluid, the apparatus for correcting temperature drift comprising a memory means for storing a relation between the fluid temperature and an output drift of the pressure sensor, and a temperature drift correcting means which calculates the amount of the output drift of the pressure sensor from data in the memory means when the fluid temperature changes, and negatives the output drift of the pressure sensor with the calculated amount of the output drift, thereby correcting the temperature drift, such that even if the fluid temperature changes, the pressure of fluid is accurately controlled.

3. An apparatus for correcting temperature drift for use in a pressure-type flow rate control apparatus comprising an orifice for flow rate control, a control valve provided in a pipe on an upstream side of the orifice, and an upstream side pressure sensor provided between said orifice and the control valve for detecting an upstream side pressure $P_1$, such that the flow rate of a fluid passing through the orifice can be controlled on the basis of the upstream side pressure $P_1$, the apparatus for correcting temperature drift comprising a temperature sensor for measuring the temperature of the fluid, a memory means for storing a relation between the temperature of the fluid and an output drift of the upstream side pressure sensor, and a temperature drift correcting means which calculates the amount of the output drift of the upstream side sensor from data in the memory means when the temperature of fluid changes, and offsets the output drift of the upstream side pressure sensor with the calculated amount of the output drift, thereby correcting the temperature drift, such that even if the temperature of fluid fluctuates, the flow rate of fluid can be accurately controlled.

4. An apparatus for correcting temperature drift for use in a pressure-type flow rate control apparatus comprising an orifice for flow rate control, a control valve provided in a pipe on an upstream side of the orifice, an upstream side pressure sensor provided between the orifice and the control valve for detecting an upstream side pressure $P_1$, and a downstream side pressure sensor provided in a pipe on a downstream side of the orifice for detecting a downstream side pressure $P_2$ such that the flow rate of a fluid passing through the orifice can be controlled on the basis of the upstream side pressure $P_1$ and the downstream side pressure $P_2$, the apparatus for correcting temperature drift comprising a temperature sensor for measuring the temperature of the fluid, a memory means for storing a relation between the temperature of the fluid and output drifts of the upstream side pressure sensor and downstream side pressure sensor, and a temperature drift correcting means which calculates the amounts of the output drifts of the upstream side pressure sensor and downstream side pressure sensor from data in the memory means when the fluid temperature changes, and offsets the output drifts of the upstream side pressure sensor and downstream side pressure sensor with the calculated output drift amounts, thereby correcting the temperature drifts, such that even if the fluid temperature changes, the flow rate of fluid is accurately controlled.

5. An apparatus for correcting temperature drift as claimed in claim 1, wherein said memory means stores a relation between the fluid temperature and a zero-point output drift of the pressure sensor at zero pressure, and the temperature drift correcting means calculates the amount of the zero-point output drift when the fluid temperature changes and negatives the zero-point output drift of the pressure sensor with the calculated amount of the zero-point output drift, thereby correcting the temperature drift.

6. An apparatus for correcting temperature drift as claimed in claim 1, wherein the memory means stores a relation between the temperature of the fluid and a span output drift of the pressure sensor under any arbitrary pressure, and the amount of the span output drift is calculated from the memory means when the temperature of fluid changes, and the calculated amount of the span output drift is added to or subtracted from the output of the pressure sensor, thereby correcting the temperature drift.

7. An apparatus for correcting temperature drift as claimed in claim 1 for use in a gas supply system, wherein a gas is flowed as a fluid, and the pressure or flow rate of the gas is controlled.

8. An apparatus for correcting temperature drift as claimed in claim 2, wherein said memory means stores a relation between the fluid temperature and a zero-point output drift of the pressure sensor at zero pressure, and the temperature drift correcting means calculates the amount of the zero-point output drift when the fluid temperature changes and negatives the zero-point output drift of the pressure sensor with the calculated amount of the zero-point output drift, thereby correcting the temperature drift.

9. An apparatus for correcting temperature drift as claimed in claim 3, wherein said memory means stores a relation between the fluid temperature and a zero-point output drift of the pressure sensor at zero pressure, and the temperature drift correcting means calculates the amount of the zero-point output drift when the fluid temperature changes and negatives the zero-point output drift of the pressure sensor with the calculated amount of the zero-point output drift, thereby correcting the temperature drift.

10. An apparatus for correcting temperature drift as claimed in claim 4, wherein said memory means stores a relation between the fluid temperature and a zero-point output drift of the pressure sensor at zero pressure, and the temperature drift correcting means calculates the amount of the zero-point output drift when the fluid temperature changes and negatives the zero-point output drift of the pressure sensor with the calculated amount of the zero-point output drift, thereby correcting the temperature drift.

11. An apparatus for correcting temperature drift as claimed in claim 2, wherein the memory means stores a relation between the temperature of the fluid and a span output drift of the pressure sensor under any arbitrary pressure, and the amount of the span output drift is calculated from the memory means when the temperature of fluid changes, and the calculated amount of the span output drift is added to or subtracted from the output of the pressure sensor, thereby correcting the temperature drift.

12. An apparatus for correcting temperature drift as claimed in claim 3, wherein the memory means stores a relation between the temperature of the fluid and a span output drift of the pressure sensor under any arbitrary pressure, and the amount of the span output drift is calculated from the memory means when the temperature of fluid changes, and the calculated amount of the span output drift is added to or subtracted from the output of the pressure sensor, thereby correcting the temperature drift.

13. An apparatus for correcting temperature drift as claimed in claim 4, wherein the memory means stores a relation between the temperature of the fluid and a span output drift of the pressure sensor under any arbitrary pressure, and the amount of the span output drift is calculated from the memory means when the temperature of fluid changes, and the calculated amount of the span output drift is added to or subtracted from the output of the pressure sensor, thereby correcting the temperature drift.

14. An apparatus for correcting temperature drift as claimed in claim 2 for use in a gas supply system, wherein a gas is flowed as a fluid, and the pressure or flow rate of the gas is controlled.

15. An apparatus for correcting temperature drift as claimed in claim 3 for use in a gas supply system, wherein a gas is flowed as a fluid, and the pressure or flow rate of the gas is controlled.

16. An apparatus for correcting temperature drift as claimed in claim 4 for use in a gas supply system, wherein a gas is flowed as a fluid, and the pressure or flow rate of the gas is controlled.

17. An apparatus for correcting temperature drift as claimed in claim 5 for use in a gas supply system, wherein a gas is flowed as a fluid, and the pressure or flow rate of the gas is controlled.

18. An apparatus for correcting temperature drift as claimed in claim 6 for use in a gas supply system, wherein a gas is flowed as a fluid, and the pressure or flow rate of the gas is controlled.

* * * * *